(12) United States Patent
Backes et al.

(10) Patent No.: US 8,161,287 B2
(45) Date of Patent: Apr. 17, 2012

(54) METHOD AND SYSTEM FOR MEMORY PROTECTION AND SECURITY USING CREDENTIALS

(75) Inventors: Michael Backes, Thalwil (CH); Shmuel Ben-Yehuda, Haifa (IL); Jan Leonard Camenisch, Rueschlikon (CH); Ton Engbersen, Feusisberg (CH); Zorik Machulsky, Gesher HaZiv (IL); Julian Satran, Atlit (IL); Leah Shalev, Zichron Yaacov (IL); Ilan Shimony, Haifa (IL); Thomas Basil Smith, Wilton, CT (US); Michael Waidner, Au (CH)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 12/792,766

(22) Filed: Jun. 3, 2010

(65) Prior Publication Data

US 2010/0242108 A1    Sep. 23, 2010

Related U.S. Application Data

(63) Continuation of application No. 11/333,066, filed on Jan. 17, 2006, now Pat. No. 7,757,280.

(51) Int. Cl.
*G06F 21/00* (2006.01)

(52) U.S. Cl. .............. 713/178; 713/176; 726/16; 726/17
(58) Field of Classification Search .................. None
See application file for complete search history.

(56) References Cited

U.S. PATENT DOCUMENTS

| 5,659,798 | A | 8/1997 | Blumrich et al. ............... 710/26 |
| 6,263,390 | B1 | 7/2001 | Alasti et al. ................... 710/308 |
| 6,345,347 | B1 | 2/2002 | Biran .............................. 711/163 |
| 6,681,346 | B2 | 1/2004 | James et al. ..................... 714/42 |
| 6,778,667 | B1 | 8/2004 | Bakhle et al. ................... 380/37 |
| 6,820,177 | B2 | 11/2004 | Poisner ........................ 711/152 |
| 7,047,404 | B1* | 5/2006 | Doonan et al. ................ 713/156 |
| 2003/0018892 | A1 | 1/2003 | Tello .............................. 713/164 |
| 2003/0177352 | A1 | 9/2003 | Camenisch et al. ......... 713/158 |
| 2004/0039937 | A1 | 2/2004 | Aissi et al. .................... 713/201 |
| 2004/0128502 | A1 | 7/2004 | Royer ........................... 713/156 |
| 2005/0273610 | A1* | 12/2005 | Kaneda ......................... 713/173 |

* cited by examiner

*Primary Examiner* — Minh Dinh
*Assistant Examiner* — Venkat Perungavoor

(57) ABSTRACT

A computer-implemented system and method for protecting a memory are provided. The system includes a memory section with privileged and non-privileged sections, a host gateway (HG) to generate a capability credential, a device controller (DC) to append the credential to data transmitted to the memory, and at least one IO device enabled to do direct memory access (DMA) transactions with the memory.

6 Claims, 5 Drawing Sheets

METHOD AND SYSTEM FOR MEMORY PROTECTION AND SECURITY USING CREDENTIALS

CROSS-REFERENCE TO RELATED APPLICATIONS

The subject Application claims priority to and is a continuation of U.S. patent application Ser. No. 11/333,066, filed 17 Jan. 2006 now U.S. Pat. No. 7,757,280, the content of which is incorporated herein by reference in entirety.

FIELD OF THE INVENTION

The present invention relates generally to the field of computer and processor architecture. In particular, the present invention relates to a method and system for memory protection and security using credentials.

BACKGROUND OF THE INVENTION

The architecture of most current personal computer (PC) systems, from desktop to server, may be conceptually and schematically illustrated by FIG. 1, to which reference is now made.

PC system 10 typically includes memory 20, which may be embedded within one or more processing units 12, or may be separate therefrom. Processing units 12 are typically coupled with IO devices 14[1]-14[i] via one or more IO buses 16, e.g., peripheral component interconnect (PCI) buses. Some or all of the IO devices may be coupled with an IO bridge 17 which may be coupled with IO bus 16. Optionally, in order to make the connection between processing units 12 and IO devices 14[1]-14[i] quicker, PC system 10 may also include one or more components that communicate with the processing units 12 and control the interaction with memory 20 and the IO buses 16, e.g., a north bridge unit 18.

Processing unit 12 typically includes a Central Processing Unit (CPU) 26 that typically refers to virtual memory addresses or space, which is translated by a memory management unit (MMU) 24 into physical addresses. The physical address is typically used by cache 22 to store data which is frequently accessed for rapid access (although some processor architecture uses virtual addresses for cache access) and for access to memory 20. In addition to 'virtual to physical' translation information, the MMU 24 typically contains memory protection information used to grant memory access to its owner, e.g., to the thread or process that requested the memory access. For example, system pages may typically be read only by a privileged process such as an operating system or other privileged process, while memory pages may be accessed by their user space processes.

In the computer architecture described in FIG. 1, there is substantially no memory protection for Direct Memory Access (DMA) done from a DMA-enabled IO device 14[1]-14[i], whether the IO device is directly coupled with IO bus 16 or whether the IO device is coupled with IO bridge 17. In both cases, the IO devices, e.g., IO device 14[1] and 14[i], communicate via DMA engine 28 to directly access memory 20.

As shown in FIG. 1, IO bus 16 is coupled with memory 20 through north bridge unit 18 without the involvement of CPU 26 and MMU 24. Therefore, IO devices 14[1]-14[i] that typically use physical addresses have access to all memory space, both to privileged memory space, such as the memory space of the operating system, and to non-privileged memory space, such as the memory space of applications running on PC system 10. Any mis-configuration of an IO device or hostile re-configuration of IO devices 14 may compromise the stability and integrity of PC system 10 by allowing the DMA engines 28 of IO device 14[1]-14[i] to corrupt any region in memory 20 of system 10.

One method to secure memory is illustrated in FIG. 2, to which reference is now made. System 30 includes one or more IO Memory Management Units (IOMMU) 32. Some or all of IO devices 14[1]-14[i] may include a local memory IOMMU 32. Alternatively, two or more IO devices 14[1]-14[i] may share a common IOMMU 32. Each IOMMU 32 typically contains translation and protection tables. Before each transaction between the IO device and the memory, the IOMMU 32 checks the tables to verify that the requested transaction is an allowed transaction.

System 30 has several drawbacks. The translation and protection tables held by IOMMU 32 may be large and contain large amounts of state information. Additionally, if more than one IOMMU 32 is used, the IOMMUs 32 have to be synced to ensure that all IOMMUs 32 have the latest translation and protection tables. Alternatively, if there is one IOMMU 32 shared between multiple units, the resultant tables held by IOMMU 32 may be large and necessitate a fast lookup mechanism in order to achieve reasonable performance time.

SUMMARY OF THE INVENTION

In accordance with some embodiments of the present invention, a method and system for memory protection and security are provided using cryptographically signed capability tokens, referred to hereinafter as credentials. In accordance with the present invention, the credential may be attached to the header of the data packet to be transferred. The credential may be, for example, a time based credential.

Accordingly, some embodiments of the present invention provide efficient secured and protected access to the memory from the IO devices that may eliminate the need to use tables of access rights and may further guarantee that the identification information cannot be forged.

The present invention may provide a computer-implemented method for protecting a memory.

The method includes, responsive to a direct memory access (DMA) request that may include an IO command and a capability (CAP) which may be received from a consumer for a transaction of data from an IO device to the memory, generating a cryptographically signed capability ($CAP_B$), forming a credential from CAP and $CAP_B$, appending the credential to the IO command, configuring the IO device according to the credential and the IO command, transmitting the data from the IO device to the memory, and, prior to allowing execution of the DMA, authenticating that the credential is valid.

Further, in accordance with an embodiment of the present invention, the step of configuring includes configuring a DMA engine to control DMA transaction of data from the IO device to the memory.

Still further, in accordance with an embodiment of the present invention, the step of authenticating includes regenerating $CAP_B$ from a key available to an authenticating entity and from the CAP, and verifying that the memory region information described in the cryptographically signed capability is the same as said requested region that was originally created, and that the cryptographically signed capability encompasses the IO command.

Additionally, in accordance with an embodiment of the present invention, the credential may be a time based credential.

Also provided in accordance with another embodiment of the present invention is a computer-implemented method for controlling a time based cryptographically signed capability credential.

The method includes cryptographically signing, at creation time of the capability, a time stamp (TS) of a time window (TW) of the capability, and revoking the credential when the TS is passed.

Additionally, in accordance with an embodiment of the present invention, the method also includes, prior to the step of revoking and upon receipt of an incoming transaction message, verifying that the TS is valid and allowing processing of the incoming transaction if the TS is valid.

Moreover, in accordance with an embodiment of the present invention, the method further includes determining whether the capability credential is needed to remain valid for more than the TW. Provided that the capability credential is needed to remain valid for more than the TW, the method includes determining whether a renewal request of the TS was received. Provided that the renewal request was received, the method includes determining whether the TS is valid. Provided that the TS is valid, the method includes determining whether the capability credential is not listed for revocation, and provided that the capability credential is not listed for revocation, renewing the TW.

Also provided in accordance with another embodiment of the present invention is a computer-implemented system for protecting a memory.

The system includes a memory section with privileged and non-privileged sections, a host gateway (HG) to generate a capability credential, a device controller (DC) to append the credential to data transmitted to the memory, and at least one IO device enabled to do direct memory access (DMA) transactions with the memory.

Additionally, in accordance with an embodiment of the present invention, the system also includes a direct memory access (DMA) engine coupled with the at least one IO device; the DMA engine controls the DMA transaction of data from the IO device to the memory.

Alternatively, in accordance with an embodiment of the present invention, the system further includes a DMA engine coupled with the device controller; the DMA engine controls the DMA transaction of data from the IO device to the memory.

Still alternatively, in accordance with an embodiment of the present invention, the system further includes a DMA engine coupled with the host gateway; the DMA engine controls the DMA transaction of data from the IO device to the memory.

Additionally, in accordance with an embodiment of the present invention, the HG generates a time based credential.

Further, in accordance with an embodiment of the present invention, a time stamp (TS) of a time window (TW) of the time based credential is cryptographically signed, at creation time of the capability credential.

Still further, in accordance with an embodiment of the present invention, the HG stores a list of revoked credentials.

Further, in accordance with an embodiment of the present invention, the HG compares a TS of a credential of an incoming transaction message to the list of revoked credentials, and the HG allows processing of the incoming transaction if the TS is not in the list.

Also provided, in accordance with an embodiment of the present invention, is a computer software product, including a computer-readable medium in which computer program instructions are stored, which instructions, when read by a computer, cause the computer to perform a method for protecting a memory.

The method includes, responsive to a direct memory access (DMA) request that may include an IO command and a capability (CAP) which may be received from a consumer for a transaction of data from an IO device to the memory, generating a cryptographically signed capability ($CAP_B$), forming a credential from CAP and $CAP_B$, appending the credential to the IO command, configuring the IO device according to the credential and the IO command, transmitting the data from the IO device to the memory, prior to allowing execution of the DMA, authenticating that the credential is valid.

Further, in accordance with an embodiment of the present invention, the step of configuring includes configuring a DMA engine to control DMA transaction of data from the IO device to the memory.

Still further, in accordance with an embodiment of the present invention, the step of authenticating includes regenerating $CAP_B$ from a key available to an authenticating entity and from CAP (included in $CAP_B$), and verifying that the memory region information described in the cryptographically signed capability is the same as the requested region that was originally created and that the cryptographically signed capability encompasses the IO command.

Additionally, in accordance with an embodiment of the present invention, the credential may be a time based credential.

Also provided, in accordance with an embodiment of the present invention, is a computer software product, including a computer-readable medium in which computer program instructions are stored, which instructions, when read by a computer, cause the computer to perform a method for controlling a time based cryptographically signed capability credential.

The method includes cryptographically signing, at creation time of the capability, a time stamp (TS) of a time window (TW) of the capability and revoking the credential when the TS is passed.

Additionally, in accordance with an embodiment of the present invention, the method also includes, prior to the step of revoking and upon receipt of an incoming transaction message, verifying that the TS is valid, and allowing processing of the incoming transaction if the TS is valid.

Moreover, in accordance with an embodiment of the present invention, the method further includes determining whether the capability credential is needed to remain valid for more than the TW. Provided that the capability credential is needed to remain valid for more than the TW, the method includes determining whether a renewal request of the TS was received. Provided that the renewal request was received, the method includes determining whether the TS is valid. Provided that the TS is valid, the method includes determining whether the capability credential is not listed for revocation, and, provided that the capability credential is not listed for revocation, renewing the TW.

BRIEF DESCRIPTION OF THE DRAWINGS

Embodiments of the present invention will now be described, by way of examples only, with reference to the accompanying drawings in which.

DESCRIPTION OF EMBODIMENTS OF THE PRESENT INVENTION

System Overview

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

Figure 3:
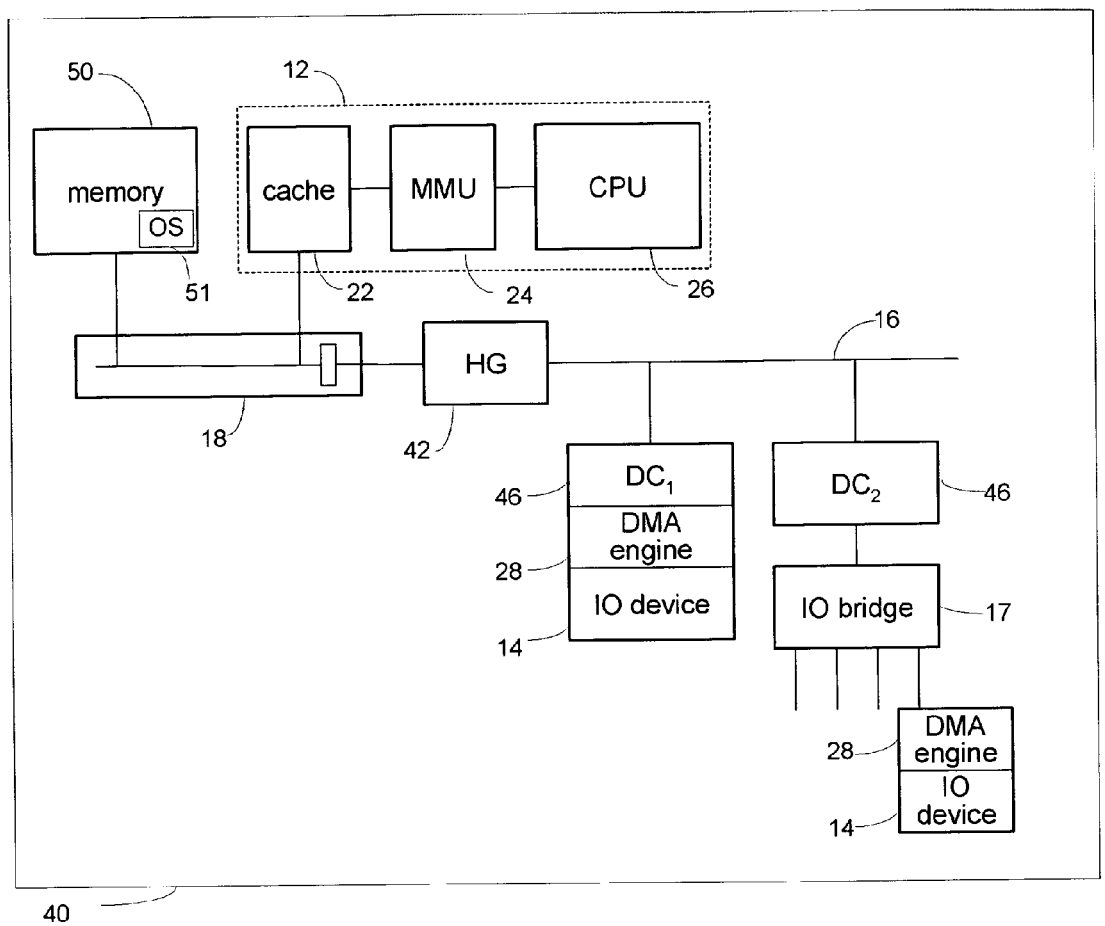
FIG. 3 is a schematic block diagram of a computer system in accordance with an embodiment of the present invention.

Reference is now made to FIG. 3 which is a schematic block diagram of a credential based computer system 40 in accordance with an embodiment of the present invention. System 40 may utilize cryptographically signed capability tokens, referred to hereinafter as credentials, to protect access to the memory 50, as will be described in detail below.

In system 40, a consumer (not shown) in communication with memory 50 may request a direct memory access (DMA) from one or more IO devices 14[1]-14[i] to memory 50. In prior art systems this would create an exposure to memory 50, allowing renegade IO devices 14[1]-14[i] to corrupt memory 50, including privileged memory space 51, which may, for example, be used by an operating system. However, in accordance with an embodiment of the present invention, a credential may be calculated. The credential may include a capability field to describe a memory region, and a cryptographic signature. Before the DMA with memory 50 is completed, the credential may be verified to confirm that the capability field is not corrupted by IO devices 14[1]-14[i]. As an example, due to a faulty 10, the capability field may have changed, causing the credential to be verified to be different than the original credential, and therefore the IO will not be allowed DMA.

In accordance with an embodiment of the present invention, a data packet may include data and a credential. The credential may be attached to the header of the data packet and may be 128 bits long. An exemplary credential may be a time based credential, which will be discussed in detail below separately.

Figure 1:
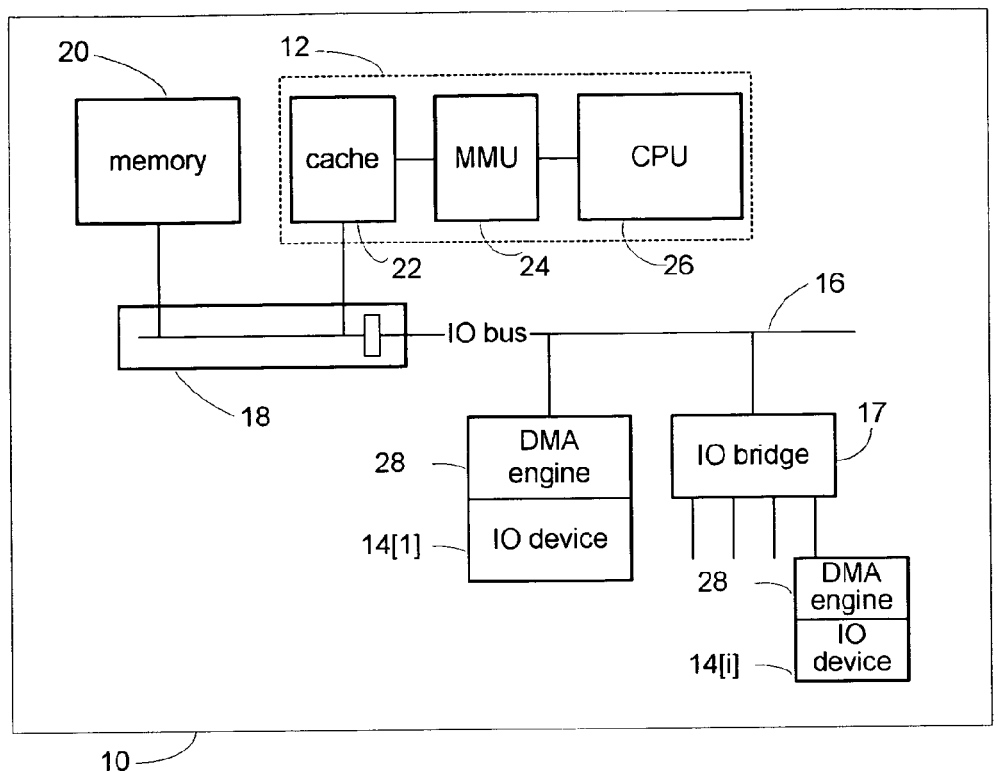
FIG. 1 is a schematic block diagram of a prior art computer system.
Figure 2:
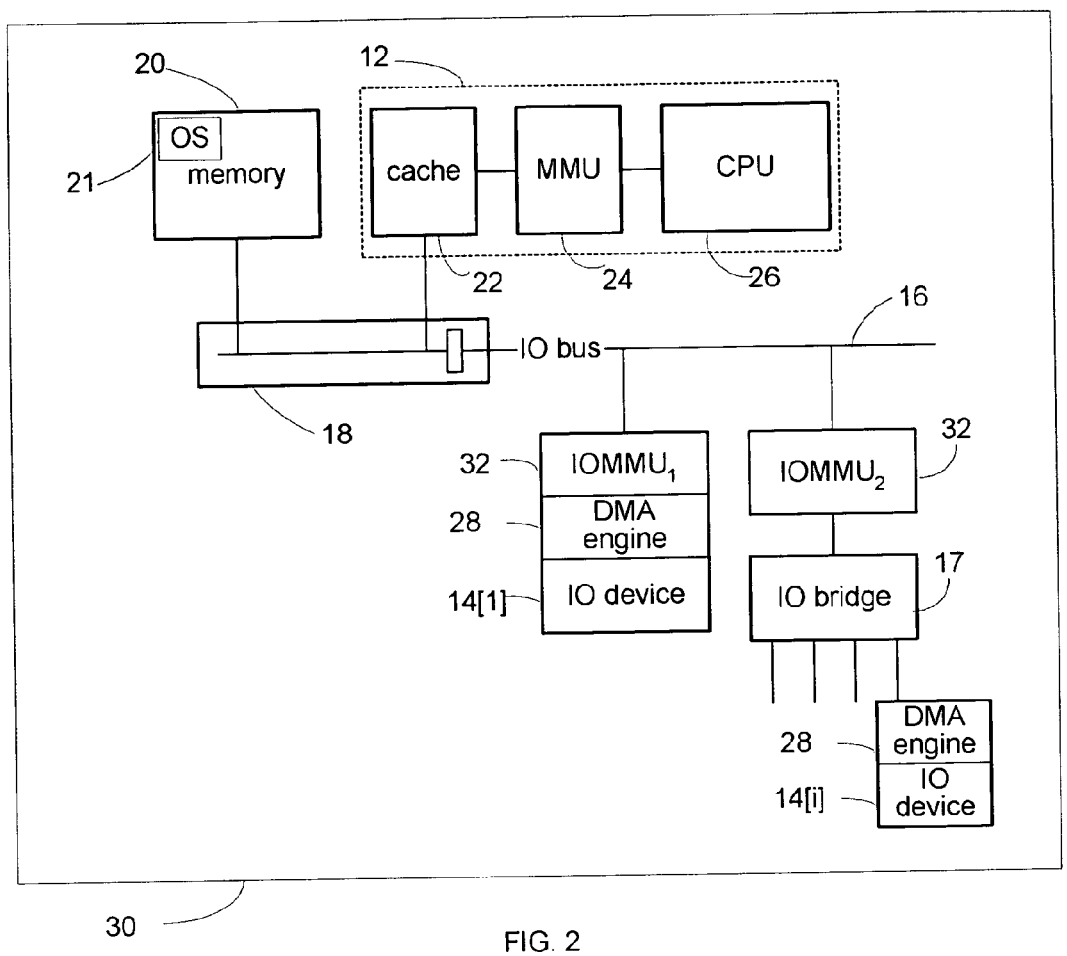
FIG. 2 is a schematic block diagram of a prior art computer system with IO Memory Management Units (IOMMU)

In addition to the components similar to the components shown in FIGS. 1 and 2, system 40 may include a host gateway (HG) 42 that may be coupled with one or more IO buses 16, e.g., peripheral component interconnect (PCI) buses and with one or more north bridges 18. HG 42 may be a gatekeeper unit that cryptographically signs the capability credentials before sending them to device controller (DC) 46, which is described below. The HG 42 may verify credentials of data intended for transmission to the memory 50. Since the credential is cryptographically signed, HG 42 does not need to store any state information of the data being transferred, e.g., it may be stateless.

System 40 may further include one or more device controllers (DC) 46 that may be locally coupled with some or all of IO devices 14[1]-14[i]. Alternatively, two or more IO devices 14[1]-14[i] may share one DC 46. DC 46 may support IO devices 14[1]-14[i] by appending the credentials created by HG 42 to data to be transmitted to memory 50.

Data Transaction

Figure 4:
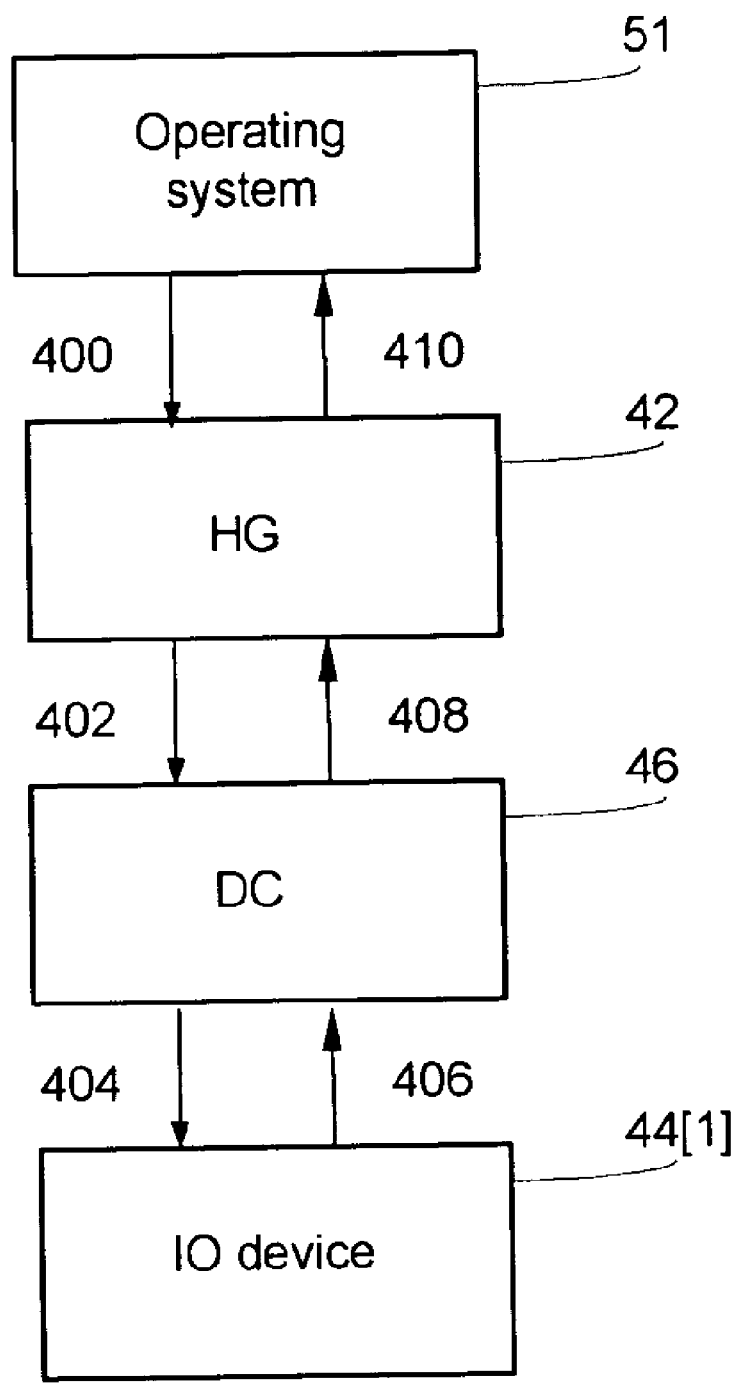
FIG. 4 is an exemplary flow chart diagram of a method of data transaction in accordance with an embodiment of the present invention.

In conjunction with FIG. 3, reference is now made to FIG. 4 which is an exemplary flow chart diagram of a method of data transaction in accordance with an embodiment of the present invention.

HG 42 may receive (step 400) requests from a consumer, e.g., an operating system or an application, for direct memory transfer of data from any of IO devices 14[1]-14[i] to memory 50. The request for the transaction of the data may include an IO command and a capability field (CAP):

Request={IO command, CAP}

The IO command may include information about the function to be performed, for example, READ or WRITE 10 sectors.

The CAP may describe the memory region to be accessed, permission, and additional information which may be required:

CAP={address, length, read/write, info}

Upon receipt of the request, HG 42 may generate a cryptographically signed capability ($CAP_B$) using, for example, a local key, according to the requested memory regions:

$CAP_B$={cryptographic_signature of CAP}

In alternative embodiments of the present invention, CAPB may be generated from a key local to CPU 26 and shared with HG 42.

Thereafter, a credential may be formed from both CAP and $CAP_B$:

Credential={CAP, $CAP_B$}

In an embodiment of the present invention the credential may be attached to the header of the data packet being sent.

As briefly discussed above, DC 46 may support IO devices 14[1]-14[i] by appending the credentials created by HG 42, to data being transmitted to memory 50. After the credential is formed, HG 42 may send (step 402) the IO command and credential to DC 46 in a secure manner, e.g., using a double hash algorithm or other secured channel:

{IO command, (CAP, $CAP_B$)}={IO command, credential}

DC 46 may receive the IO command and the credential, and the direct memory access (DMA) transaction may be configured (step 404) accordingly. DMA engines 28 or any of IO devices 14[1]-14[i] may also be configured accordingly to allow the DMA transaction. It should be noted that DMA engines 28 may be coupled with the IO devices as shown in FIG. 3. Alternatively, a DMA engine may be coupled with DC 46 and/or HG 42 to allow DMA transaction of all IO devices coupled with that DC and/or HG, respectively.

As a result, any of the IO devices 14[1]-14[i] that was configured, e.g., IO device 14[1], may request DMA to the memory 50 of system 40. The configured IO device 14[1] may request (step 406) from DC 46 to transmit data via DMA to memory 50. DC 46 appends (step 408) the credential to the data received from IO device 14[1], and HG 42 may authenticate (step 410) the credential. HG 42 may regenerate CAPB from the local key and verify that the region information described in the credential is the same as the one that was originally created and has not been modified, and that it encompasses the requested IO command, e.g., the requested memory access. If the transaction is within the specified capability and the cryptographic signature is authenticated, then memory access may be granted and the data transfer is executed.

In this manner HG 42 may be stateless, e.g., may not need to store any state information of the data being transferred in each DMA IO transaction. Therefore, HG 42 is not encumbered with a table. HG 42 may hold data required to verify the credentials of the data intended for transmission to the memory 50. HG 42 may allow the transaction to complete only if the correct region is described by CAP.

It should be noted that in various systems, e.g. a conventional desktop or laptop or a simple server with a few clients, physical address may be used for DMA requests. In other systems, e.g., larger systems, virtual addresses may still be used by adding a memory translation unit between the HG 42 and the memory 50 (not shown).

Time Based Credential

Cryptographically signed credentials may be used for various applications requiring an authenticated capability, and the discussion below in the context of the present invention is given by way of example only. As shown above, a credential may be used to verify a memory region used by any of IO devices 14[1]-14[i]. However, a capability protected by the credential, such as a memory window capability (CAPW), may be of a dynamic nature—it may be allocated, re-allocated, or deleted depending on the originating process, operating system, and additional factors, e.g., hypervisor paging algorithms, etc. An issued memory credential has to be revoked as soon as the consumer's process or thread has ended or has been terminated, otherwise the IO device 14 may access or modify an area in memory which has been re-assigned.

One optional solution is for the capability signing entity (HG 42 in FIG. 3) to keep a list of revoked credentials and match any incoming credential with the revoked list. Another option is to define a time window during which the credential is valid, and once that time is passed the credential is revoked, as will be described in detail below.

Figure 5:
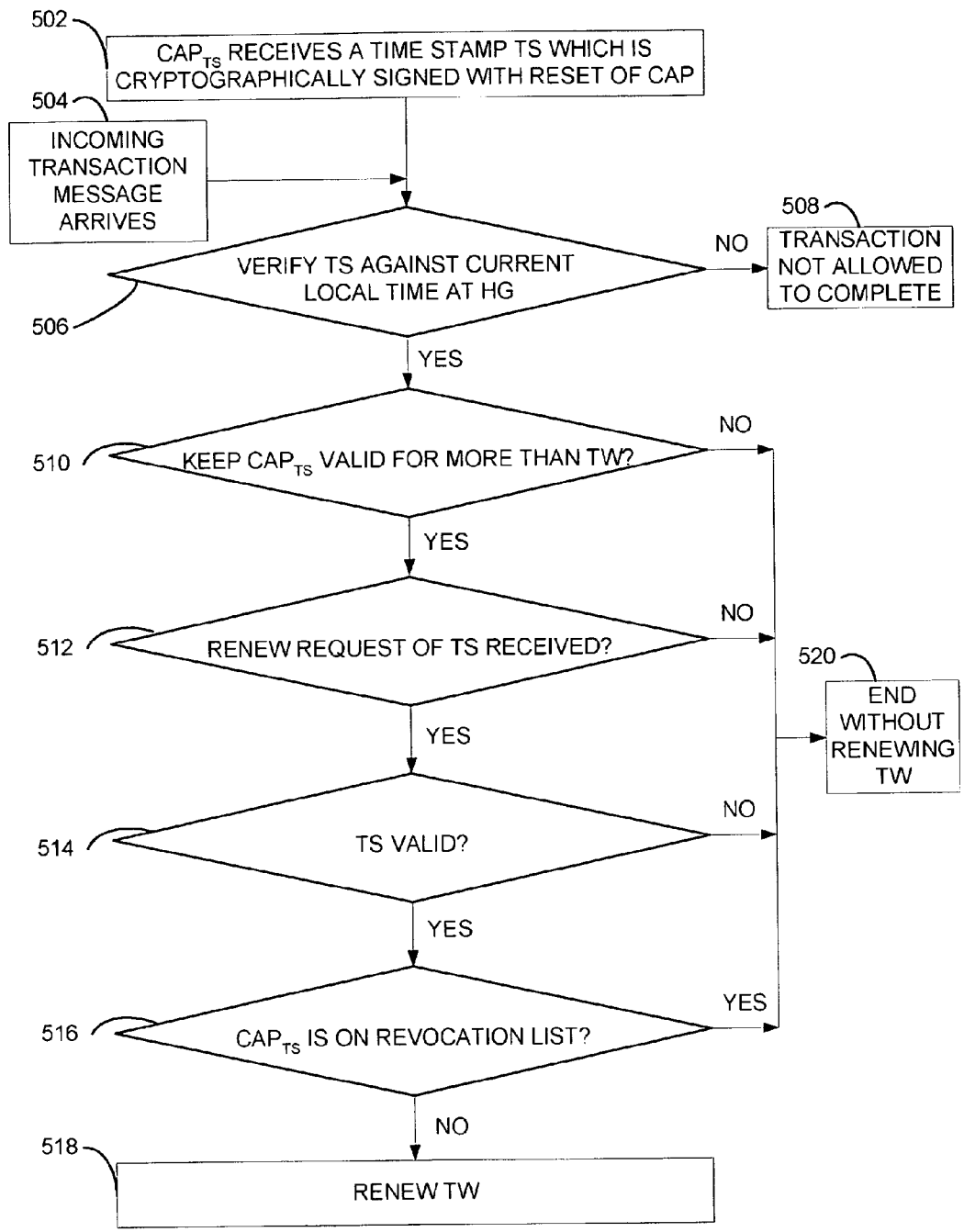
FIG. 5 is a flow chart diagram of method to control a time window in accordance with an embodiment of the present invention.

Reference is now made to FIG. 5, which is a flow chart diagram of a method to control a time window in accordance with an embodiment of the present invention. Each capability, CAP, may be valid for a limited time window, TW. At creation time, CAP may receive (step 502) a time stamp, TS, of TW, which may be cryptographically signed with the reset of CAP (in our example a description of the memory region):

$CAP_{TS}$=[id, TS, CAP]

Since time stamp TS is created and verified by the same entity, e.g., HG 42, its effect is local. Thus, there may be no need for global clock synchronization, e.g., there is no need for a shared clock to HG 42 and DC 46, and no synchronization between them is required. When an incoming transaction message arrives (step 504) with an attached $CAP_{TS}$ to HG 42 (see FIG. 4, steps 400 and 408), the validity of TS may be verified (step 506), e.g., against the current local time (in addition to verifying the actual capability). If the time window has passed, then the process of the transaction is not allowed (step 508) to complete.

If the entity using $CAP_{TS}$, e.g., DC 46, needs to keep a capability valid for more than TW (step 510), it has to renew its time stamp. Since a capability is revoked once its time window has passed, HG 42 needs to keep revocation lists only for the duration of TW—a $CAP_{TS}$ older than the allowed TW will not be renewed or honored if used. The revocation list may be a function of the length of TW—a small TW requires keeping a short revocation list, at the expense of more renewal requests.

The time stamp TS may be renewed (step 520) after a special renewal request is received (step 512), or, optionally, the request may be piggybacked onto other messages. The $CAP_{TS}$ may be renewed in case the current time stamp is still valid (step 514) and the CAP is not on the revocation list (step 516). In accordance with an embodiment of the present invention, the revocation list needs keep only one bit per credential. It may be implemented as a FIFO or as two lists, alternately purging lists every TW. Otherwise, the time stamp is not renewed (step 520).

It should be noted that the described scheme may not be efficient in cases in which many capabilities are needed to describe a single 'user', for example an IO device using a large scatter/gather list. Renewing a large number of credentials may tax the network, capability creation entity, and capability user entity. Since all of these memory windows are related to a single user, a common time capability, $CAP_T$, may be defined, to allow renewal of all window credentials $CAP_W$ of the same user.

Accordingly, all window credentials $CAP_W$ may be split into window parts ($CAP_I$) and a common time part ($CAP_T$):

$CAP_I$=[id, CAP]

$CAP_T$=[id, timestamp]

Each message may require sending $CAP_T$ and the relevant memory window capability, $CAP_W$. HG 42 may need to renew the time stamp in $CAP_T$ in order to verify the rest of capabilities having the same id. Since all $CAP_I$ relate to the same user, they may all be revoked once TW has passed or the CAP id is added to the revocation list.

In the description above, numerous specific details were set forth in order to provide a thorough understanding of the present invention. It will be apparent to one skilled in the art, however, that the present invention may be practiced without these specific details. In other instances, well-known circuits, control logic, and the details of computer program instructions for conventional algorithms and processes have not been shown in detail in order not to obscure the present invention unnecessarily.

Software programming code that embodies aspects of the present invention is typically maintained in permanent storage, such as a computer readable medium. In a client-server environment, such software programming code may be stored on a client or server. The software programming code may be embodied on any of a variety of known media for use with a data processing system. This includes, but is not limited to, magnetic and optical storage devices such as disk drives, magnetic tape, compact discs (CD's), digital video discs (DVD's), and computer instruction signals embodied in a transmission medium with or without a carrier wave upon which the signals are modulated. For example, the transmission medium may include a communications network, such as the Internet. In addition, while the invention may be embodied in computer software, the functions necessary to implement the invention may alternatively be embodied in part or in whole using hardware components such as application-specific integrated circuits or other hardware, or some combination of hardware components and software. For example, HG 42 may be embodied in computer software, or alternatively, in part or in whole using hardware components.

The present invention is typically implemented as a computer program product, comprising a set of program instructions for controlling a computer or similar device. These instructions can be supplied preloaded into a system or recorded on a storage medium such as a CD-ROM, or made available for downloading over a network such as the Internet or a mobile telephone network.

Improvements and modifications can be made to the foregoing without departing from the scope of the present invention.

It will be appreciated by persons skilled in the art that the present invention is not limited to what has been particularly shown and described hereinabove. Rather, the scope of the present invention includes both combinations and sub-combinations of the various features described hereinabove, as well as variations and modifications thereof that are not in the prior art, which would occur to persons skilled in the art upon reading the foregoing description.

The invention claimed is:

1. A computer-implemented method for secure memory access management, said method comprising:
   receiving a request for data transaction for an operating system to access an IO device via a direct memory access (DMA) procedure, wherein the request comprises an IO command and a capability field (CAP), wherein the CAP comprises at least one of a target memory address and an IO command indicating whether target data is to be read from or written to the target memory address;
   cryptographically signing the CAP using a local key to generate a credential;
   submitting the request with the generated credential to a device controller (DC) associated with the IO device configured to support the DMA procedure, resulting in the IO device servicing the submitted request, wherein the target data is provided to the DC;
   receiving from the DC the target data with the credential appended to the target data;
   authenticating the credential appended to the target data to verify the target data, wherein the authenticating is performed by using the local key used to cryptographically sign the CAP used to generate the credential;
   wherein at creation time of said CAP, a time stamp (TS) of a time window (TW) associated with the time of creation of said CAP is cryptographically signed and the cryptographically signed TS is attached to the CAP used to generate the credential, such that the TS is passed to the DC as a part of the request that is submitted to the DC; and
   revoking said credential when said TS is beyond a certain threshold, in response to receiving from the DC the target data with the credential that includes the TS as a part of the CAP.

2. The method of claim 1, and wherein prior to said revoking, said method further comprises:
   upon receipt of an incoming transaction message, verifying that said TS is valid; and
   allowing process of said incoming transaction if said TS is valid.

3. The method of claim 2 further comprising:
   determining whether said capability credential is needed to remain valid for more than said TW;
   provided that said capability credential is needed to remain valid for more than said TW, determining whether a renewal request of said TS was received;
   provided that said renewal request was received, determining whether said TS is valid;
   provided that said TS is valid, determining whether said capability credential is not listed for revocation; and
   provided that said capability credential is not listed for revocation, renewing said TW.

4. A computer program product comprising program code embedded in a non-transitory data storage medium wherein execution of the program code on a computer, causes the computer to:
   receive a request for data transaction for an operating system to access an IO device via a direct memory access (DMA) procedure, wherein the request comprises an IO command and a capability field (CAP), wherein the CAP comprises at least one of a target memory address and an IO command indicating whether target data is to be read from or written to the target memory address;
   cryptographically sign the CAP using a local key to generate a credential;
   submit the request with the generated credential to a device controller (DC) associated with the IO device configured to support the DMA procedure, resulting in the IO device servicing the submitted request, wherein the target data is provided to the DC;
   receive from the DC the target data with the credential appended to the target data;
   authenticate the credential appended to the target data to verify the target data, wherein the authenticating is performed by using the local key used to cryptographically sign the CAP used to generate the credential;
   wherein at creation time of said CAP, a time stamp (TS) of a time window (TW) associated with the time of creation of said CAP is cryptographically signed and the cryptographically signed TS is attached to the CAP used to generate the credential, such that the TS is passed to DC as a part of the request that is submitted to the DC; and
   revoke said credential when said TS is beyond a certain threshold, in response to receiving from the DC the target data with the credential that includes the TS as a part of the CAP.

5. The computer program product of claim 4, wherein prior to said revoking, execution of the program code further causes the computer to:
   upon receipt of an incoming transaction message, verify that said TS is valid; and
   allow process of said incoming transaction if said TS is valid.

6. The computer program product of claim 5 wherein execution of the program code further causes the computer to:
   determine whether said capability credential is needed to remain valid for more than said TW;
   provided that said capability credential is needed to remain valid for more than said TW, determine whether a renewal request of said TS was received;
   provided that said renewal request was received, determining whether said TS is valid;
   provided that said TS is valid, determine whether said capability credential is not listed for revocation; and
   provided that said capability credential is not listed for revocation, renew said TW.

* * * * *